July 26, 1949.  R. M. ROBERTS ET AL  2,477,555
MINERAL FIBER MAT AND PROCESS OF MANUFACTURE
Filed Aug. 18, 1944
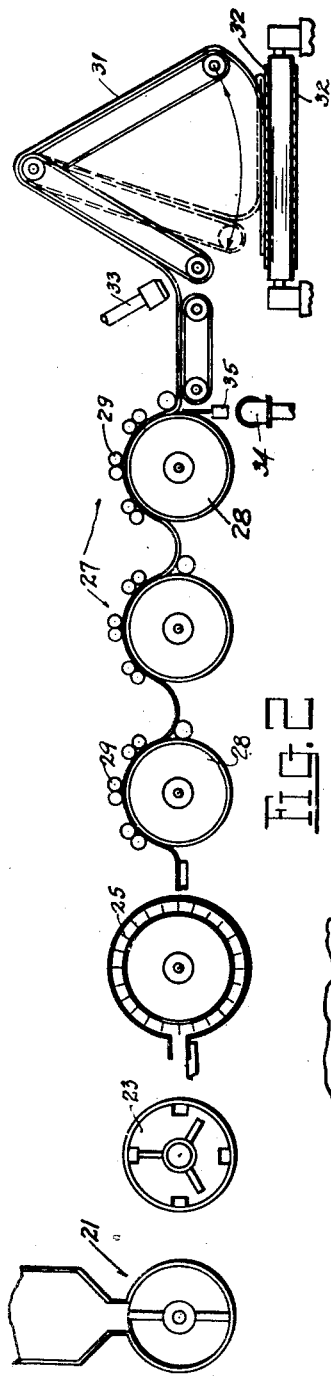
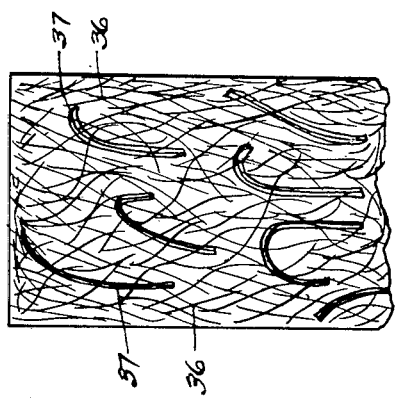
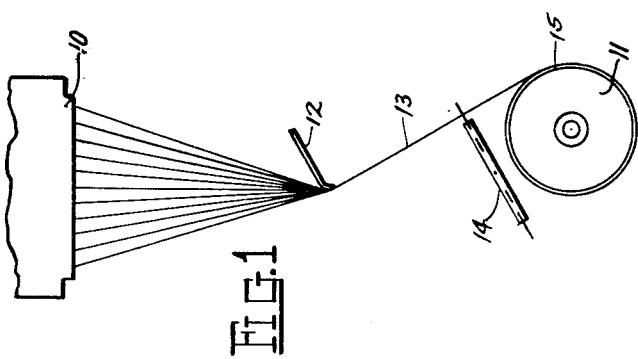
INVENTOR.
Richard M. Roberts
Theodore H. Metzler.
BY
Staelin & Overman
Attorneys.

Patented July 26, 1949

2,477,555

UNITED STATES PATENT OFFICE 2,477,555

MINERAL FIBER MAT AND PROCESS OF MANUFACTURE

Richard M. Roberts, Granville, and Theodore H. Metzler, Toledo, Ohio, assignors to Owens-Corning Fiberglas Corporation, a corporation of Delaware Application August 18, 1944, Serial No. 550,114

15 Claims. (Cl. 154—28)

This invention relates to the manufacture of glass fiber products and particularly to the production of low density mats of interbonded glass fibers.

It is an object of the invention to provide fibrous glass mats of haphazardly arranged very fine glass fibers, that will be replete with voids or air spaces to obtain high acoustic and thermal insulating properties.

It is a further object of the invention to make mats of fine glass fibers that will be highly resilient and have a high degree of integrity.

It is another object of the invention to provide fibrous glass mats that while being resilient have also a certain resistance to compression making them suitable for cushioning and padding.

It is a further object of the invention to provide a glass fiber mat having increased tensile strength in a direction parallel with the major faces of the mat. Because of its strength such a mat is useful as reinforcement for resinous or plastic materials.

The invention comprises the manufacture of mats of fine glass fibers, say from .0001 to .0006 inch and preferably about .0002 to .0004 inch diameter, bonded together into an integral body. The fine fibers are haphazardly arranged to provide low density and a large amount of voids and air spaces in the mat to obtain both high thermal insulating values as well as good acoustic insulation properties. The haphazard arrangement of the fibers also provides uniformity of texture and a low density mat that displays increased resilience. The fibers may be bonded together in a way to provide integrity and strength of the mat and may be so related and interbonded as to provide a higher degree of resistance to compression coupled with the high resilience, thus making the mat highly useful as cushioning and padding. The arrangement and distribution of the fibers in the mat may also be such as to provide increased tensile strength in selected directions and other properties in the mat admirably suiting the mat for use as reinforcing means for plastics.

Referring to the drawings:

Figure 1 is a diagrammatic illustration of apparatus for making glass fibers;

Figure 2 is a schematic illustration of the process for making the mats of the present invention;

Figure 3 is an enlarged view of a portion of a mat made in accordance with the invention and showing the disposition of the fibers in a schematic fashion;

Figure 4 is an enlarged side view of the same showing the fiber arrangement schematically; and Figure 5 is an enlarged cross-sectional view of a plastic body reinforced with the mat of the present invention.

With a view to obtaining a product made up of very fine glass fibers arranged in accordance with the present invention, the starting material of the present process is glass textile fibers collected in the form of strands each comprising a hundred or more fine filaments of from .0001 to .0006 inch diameter bundled together. The starting material may also be yarns of one or more strands of these fine glass fibers twisted and plied. Where yarns are used they are preferably employed in conjunction with a substantial proportion of fibers in the form of strands. Both the strands and yarns may be the waste or scrap resulting from the manufacture of glass fiber strands, yarns, cloth and other textile products.

Textile glass fibers may be made in several ways. One process consists in flowing a plurality of streams of molten glass and attenuating these streams mechanically by means of a drum or spool onto which the attenuated fibers are wound. The fibers made by this process are of relatively great length, ordinarily extending continuously for hundreds of feet. Because of this the process is known as the continuous fiber process. Another method for manufacturing glass textile fibers differs from the continuous fiber process in that the streams of molten glass are attenuated by a gaseous blast of air or steam and as they are formed the fibers are collected in a thin web which is drafted out into a sliver. In the drafting, the originally continuous fibers are broken up into shorter lengths of an average of from about 5 to 20 inches. This method is known as the staple fiber process.

The products resulting from both of these processes are strands of fine glass fibers, each strand containing hundreds of fibers lying in substantial parallelism in the strand. The term "parallelism" is, of course, intended to be inclusive of the arrangement of the fibers in the strand whether the strand is twisted or not. In the continous fiber strand the fibers are held together in strand form by means of a binding material, for instance, a starch product, applied to the fibers at the point at which they are collected into a strand. Ordinarily no binding material is required in the case of strands of staple glass fibers because there is a certain amount of interfelting of the fibers providing sufficient integrity to maintain the fibers in sliver form.

While the invention embraces strands and yarns made by either process, continuous fiber strands are preferred and for this reason the invention will be described in connection with textile glass fibers of this variety.

Referring to the drawings and particularly to Figure 1, the apparatus for making continuous glass fibers comprises a receptacle 10 for molten glass and having in its lower wall a plurality of orifices through which the glass flows in the form of fine streams. The streams are attenuated by means of a revolving drum 11 and intermediate the drum and receptacle 10 the fibers as they are formed are drawn over a guide 12 by which they are collected into a strand 13. A binding and lubricating material, for instance an aqueous emulsion containing dextrinized starch and vegetable oil, is applied to the fibers at the guide 12 to bind the hundred or more individual fibers into an integral strand. A traversing device 14 of any desired construction is employed to traverse the strand lengthwise of the drum as it is wound to build up a uniform package 15 of fibrous glass strands on the drum.

As a result of this manner of collecting the strands of fibrous glass, the package collected on the drum is made up of more or less angularly related strands (the angular relation resulting from the traversing movement) and each strand comprises a multiplicity of glass fibers lying in parallel relation with each other and bonded together in the strand. In the manufacture of yarns from the strands in the package 15, difficulty is sometimes experienced in completely unwinding all of the strands from the package so that a portion of the package must be discarded as far as its processing into yarns is concerned. Such discarded portions of packages are an economical source of material for manufacture of the present products, but other packages may, of course, be used.

In accordance with the present invention the glass fiber strands wound into the package are removed from the drum by cutting the package along a line extending generally lengthwise of the drum and unrolling the package from the drum. The package of strands thus taken from the drum is a compact pad or mass of fibrous glass with the fibers being all of a length corresponding approximately to the circumference of the drum, and the fibers being arranged in strands with the strands all extending substantially parallel with the major faces of the unrolled package and in more or less angular relation with each other.

This mass of compact fibrous glass of high density is converted to a resilient fluffy mat by treating it to separate and loosen the strands and to separate and loosen the fibers of a certain proportion of the individual strands. This separating and loosening may be done by a selected combination of the conventional picking processes, the particular processes employed and their order of employment being selected to obtain the particular type of product desired.

Preferably the mass of fibrous glass unrolled from the drum is first fed into a conventional chopper represented schematically at 21 in Figure 2. The chopper cuts up and breaks open the compact mass of fibrous glass and cuts the strands and fibers to shorter lengths. The fibrous material may be fed through the chopper more than once, say three times, depending upon the degree to which it is desired to reduce the length of the fibers. Fiber length of an average of about 1½ to 3 inches has been found highly suitable for the further processing of the fibers, tending to give a more uniform mat.

From the chopper the fibrous glass is fed through a picker of the conventional "beater" type represented at 23. This type of picker is provided with beaters and coacting blades which break open the compact mass of fibrous material, separating the mass into a flocculent condition of rather high density. The operation of this type of picker on the material may be repeated if it is desired to obtain a lighter density of the fibrous material.

The material from the picker 23 may be fed to a second picker of the "shredder" type illustrated at 25. This type of picker is provided with a drum having closely spaced teeth projecting from its periphery which tear apart the fibrous material and serve principally to tear apart the mass into individual fibers. The extent of this tearing apart may be governed by the number of times the fibrous material is passed through this picker, three or four passages through the picker providing a uniformly substantially opened mass of fibers. Less passages through the picker 23, say one or two, result in a fibrous mass in which a substantial number of the strands remain in their original condition or are incompletely separated into individual fibers. These unopened or incompletely opened strands are distributed haphazardly throughout the mass of fibrous glass and are thoroughly interlaced with the fibers from the completely opened strands.

Instead of the picker 25 or in conjunction therewith, a device 27 of the Garnett machine type may be employed to further open, fluff the fibrous glass and to arrange it in the form of a continuous web. The fibers as they pass through the Garnett machine are drawn by the large rolls 28 between pins or teeth on the small rolls 29 of the Garnett, the teeth moving in opposite directions or at different speeds than the travel of the fibrous material so that the fibers are drawn apart and rearranged by a combing action into a uniform more or less haphazard disposition but with the fibers extending predominently in the general direction of travel of the fibers through the Garnett. The degree of this orienting of the fibers and strands and the proportion of unopened or incompletely opened strands may be varied by regulating the rate or direction of movement of the teeth of the Garnett rolls relative to the large rolls. The greater relative movement between the two sets of rolls provides the greater combing action and hence the greater degree of opening of the strands and the greater the orientation of the fibers and strands in the same general direction.

We have found that the processing of fibrous glass in the conventional Garnett machine is complicated by the presence of a large amount of static electricity which makes removal of the web from the last roll of the Garnett difficult. To overcome this a steam pipe 34 is located beneath the doffer comb 35 of the Garnett and steam released from openings along the length of the pipe is permitted to drift up through the web in the neighborhood of the comb. The amount of steam employed should be carefully regulated, an insufficient amount failing to obtain ready removal of the web from the Garnett roll while too large an amount unduly prolongs the curing of the binder. The intended purpose is fully served without adverse effect upon subsequent treatments of the web if the flow of steam is initially regulated so that the fibrous glass coming from the Garnett feels slightly damp to the touch and if then the flow of steam is reduced just enough to remove this damp feeling.

Alternatively, a conventional electrically powered static eliminator may be employed to neutralize the effects of static electricity on the web.

The fibers from the Garnett machine are in the form of a loose web of glass fibers which may be rolled or cut into shorter lengths for use, or which may have a binding material or other impregnant applied thereto. If it is desired to produce sheets of greater thickness the web from the Garnett machine is fed by suitable means such as a conventional lapper 31 onto a traveling belt 32. The web is laid back and forth over the belt in directions crosswise of the travel of the belt so that the web is superposed on itself to build up a mat of desired thickness. As the web comes from the Garnett machine and, where the web is to be superposed on itself, prior to the superposing of the web into a mat or simultaneously therewith, a bonding material of any suitable type is applied to the fibrous glass. Preferably the bonding agent is made up of an aqueous solution of "A" stage phenol formaldehyde emulsion and a lubricant such as petroleum oil. A suitable resin and oil composition of this type is more fully described in the Bergin and Simison Patent No. 2,252,157. Other resins and other lubricants may be used.

The binding material may be applied by means of spray guns 33 directed onto the web either at the point at which it moves into the lapper 31 or at the point where the web is distributed onto the belt 32. The amount of binding material applied to the web is ordinarily in amounts sufficient to provide about 5 to 20% of binding material by weight of the fibrous glass.

The web or mat after it leaves the Garnett or the lapper, where the latter is used, is fed through an ordinary oven to heat the mat and cure or set up the binder. During heating the mat may be held to desired density and thickness between two platens or belts which are preferably foraminous to permit circulation of heated air through the mat to aid curing of the binder. After the binder has been set, cured or dried by this or any other suitable process, the mat may be rolled or may be cut into shorter lengths for storing, transportation and use.

The number of times the fibrous glass is passed through either one, two or all of the opening and picking devices is determined by the properties desired in the finished mat. If a very low density mat of fluffy material is required, the fibrous glass is usually passed through the first and second pickers about one to four times each and once or twice through the Garnett. As before mentioned, the second picker may be dispensed with in favor of the Garnett.

Passage of the fibrous glass through the first type of picker tends to separate the strands from each other and passages through the second type of picker further separate the strands and separate the fibers in the individual strand. The Garnett machine performs a similar operation and in addition arranges the fibers into a web. By judicious selection of the number of times the fibrous glass is passed through one or both of the pickers a mat may be made in which a substantial proportion of the fibers remain arranged in the form of strands. The retention of the fibers in strand form may be aided by applying a binding material to the strand before the strands are fed through the pickers to limit the degree to which the strands are separated into individual fibers. One example of such a binding material is dextrinized starch applied to the strands and then heated to a temperature of about 200° C. for an hour or two to convert the starch to a rigid bonding substance, which tends to prevent separation of the strands into fibers when the strands are treated in the manner described.

As a result of this incomplete opening of the strands there are distributed throughout a mass of haphazardly arranged fibers a large number of bundles of fibers, the hundreds of fibers in the individual bundles being arranged in parallel and compact relation. This distribution of the fibers is shown in Figure 3, the fully dispersed fibers being represented at 36 and the bundles being shown at 37.

The number and average diameter of bundles of fibers in the mat may be varied depending upon the properties desired in the mat, relatively few bundles being desired when the mat is used for acoustic or thermal insulation while a larger number of larger average size bundles are preferred when the mat is employed as cushioning material or as plastic reinforcement.

By the application of the smaller of the specified amounts of binding material to the web, the fibers in the bundles are held together and the bundles are secured to each other and to the fibers in the mat mainly at spaced apart points such as the points of juncture of the strands and fibers and are not encased and completely impregnated with the rigid binding material. Consequently the bundles have substantially the same flexibility as the individual fibers that make up the bundles but have a resistance to flexure approximately equal to the sums of the resistances of all the fibers in the bundle. The structure is analogous to a leaf spring. This provides a highly resilient fibrous glass mat but one also having additional resistance to compression so that the mat is not only suited for thermal and acoustic insulation, but is also useful as a padding or cushioning material. The resistance to compression may be increased by decreasing the degree of opening of the yarns and strands so that more of the fibers are present in bundles, or by applying more binding material in order to more fully impregnate the bundles, or both the proportion of unopened strands or bundles and the quantity of binder may be increased. With larger amounts of binder the bundles are stiffened, with the maximum stiffness of the bundles being obtained when the bundles are substantially entirely impregnated and encased with the binding material.

The presence of a large number of bundles of fibers increases the reinforcing effect of the mat when incorporated in a body of resin or plastic. The compact arrangement of the fibers in strands provides a greater density of fibrous glass in a body of resin and consequently has a salutary effect on the reinforcing properties of the mat.

It has also been found advantageous to employ as plastic reinforcement a mat in which the fibers and especially the bundles of fibers extend predominantly in the same general direction. This arrangement of the fibers and bundles is illustrated schematically in Figures 3 and 5 where both the completely dispersed fibers 36 and the unopened or incompletely opened bundles 37 of fibers extend predominantly in the direction of the length of the mat. This direction is the direction of travel of the fibrous material through the Garnett machine, the orienting of the fibers and bundles resulting from the combing action of the teeth of the Garnett.

A mat of fibrous glass oriented as described imparts increased tensile strength to the body of plastic 39 in the direction coinciding with predominant direction of the fibers and bundles of fibers. This strength has been found to be five or more times as great as the tensile strength in directions transverse to the predominant direction of the fibers, which property obviously is attended with advantages in providing directional reinforcement of plastic bodies.

The fibrous mat is incorporated in a body of plastic by impregnating the mat with the selected resinous material and then in the conventional way curing or setting the resin. The resulting product is a continuous resinous body having the glass fibers arranged therein as a discontinuous phase.

The presence of a large proportion of bundles of fibers also makes the mat of the present invention ideally suited to applications as shock-absorbing cushions, such as crash-pads, and other pads and cushions, for instance, seat cushions, pillows, mattresses and the like. The product of the present invention may also serve as buoyancy material in life preservers, rafts, etc., by being coated and impregnated with a suitable water-repellent substance, for example, an organo-silicon polymer of the general type available to the trade. The thin mats of the invention are also useful as wrapping for underground pipes and other conduits, the increased tensile strength in selected directions facilitating tightly wrapping the mats about the pipes.

Various modifications may be made within the spirit and scope of the appended claims.

We claim:

1. A fibrous glass body comprising a multiplicity of strands each composed of a plurality of glass fibers substantially all lying in closely associated relation with each other along their lengths in textile strand form, said strands being haphazardly arranged and distributed through the mat, and glass fibers haphazardly arranged relative to each other in the mat and intertangled with said strands to aid in providing integrity of mass structure of the mat.

2. As a product of manufacture, a body of glass fibers of which a substantial proportion are associated together in a multiplicity of strands in which the fibers lie in parallelism with each other in the individual strand, the fibers in each strand extending substantially continuously throughout the length of the strand, the strands being haphazardly arranged and randomly dispersed through the body, and a substantial proportion of the remainder of the fibers of the body being individually haphazardly arranged glass fibers, the strands and the individually arranged glass fibers being intermingled to aid in providing integrity of mass structure of the body.

3. As a product of manufacture, a body of glass fibers of which a substantial proportion are associated together in a multiplicity of strands in which the fibers lie in parallelism with each other in the individual strand, the strands being dispersed through the body, and being haphazardly arranged except for extending lengthwise predominantly in the same general direction, and a substantial proportion of the remainder of the fibers of the body being individually haphazardly arranged relative to each other in the body, the strands and the individually arranged glass fibers being intermingled to aid in providing integrity of mass structure of the body.

4. As a product of manufacture, a resilient, compressible body of glass fibers, a substantial proportion of said fibers being associated together in a multiplicity of strands in which the fibers lie in parallelism with each other in the individual strand, the strands being randomly dispersed throughout the body, a substantial proportion of the fibers of the body being haphazardly arranged individual glass fibers, the strands and the individual glass fibers being intermingled to provide integrity of mass structure of the body, and a binding material distributed throughout the body and coating the fibers and strands and bonding them together.

5. As a product of manufacture, a mat of fibers, a substantial proportion of said fibers being glass fibers associated together in a multiplicity of strands in which the fibers lie in parallelism with each other in the individual strand, a binding material bonding the fibers together in strand form, and a substantial proportion of the remainder of the fibers of the mat being individually haphazardly arranged relative to each other in the mat, the strands and the individually arranged fibers being intermingled to impart integrity of mass structure to the mat.

6. As a product of manufacture, a mat of glass fibers, a substantial proportion of said fibers being associated together in a multiplicity of strands in which the fibers lie in parallelism with each other in the individual strand, the strands being haphazardly arranged and randomly dispersed throughout the body, a substantial proportion of the remainder of the fibers of the body being individually haphazardly arranged glass fibers, the strands and the individually arranged glass fibers being intermingled to impart integrity to the body, and a resin distributed throughout the body and binding the fibers and strands together.

7. The process of making a resilient mat of glass fibers from a mass of strands of fibrous glass, each of which strands is composed of a multiplicity of fine glass fibers arranged in compact relation in parallelism with each other in the individual strand, comprising forming a mat of the fibers and rearranging the fibers of a substantial proportion of the strands into haphazardly distributed relation, and preserving the fibers of the remainder of the strands in substantially their original parallel relation in strand form.

8. The process of making mats of glass fibers which comprises treating a mass of fibrous glass in which the fibers are arranged in a multiplicity of strands with the fibers in the individual strands arranged compactly in parallelism with each other in the individual strand by separating at least some fibers from a substantial proportion of the strands while preserving the remainder of the fibers in strands, and rearranging the separated fibers and remaining strands in haphazard relation.

9. The process of making a mat of glass fibers from a mass of strands of fibrous glass, each of which is composed of a multiplicity of fine glass fibers arranged in compact relation in parallelism with each other in the individual strand, comprising forming a mat of the fibers and rearranging at least some of the fibers of a substantial proportion of the strands into haphazard and uniformly distributed relation, and preserving the remainder of the fibers in their original parallel relation in strand form.

10. The process of making resilient mats of glass fibers which comprises cutting to substantially uniform lengths the fibers and strands of a mass of fibrous glass in which the fibers are arranged in a multiplicity of strands with the fibers arranged compactly in parallelism with each other in the individual strand, separating the fibers of a substantial proportion of the cut strands while preserving at least in substantial measure the integrity of the remainder of the strands, rearranging the separated fibers and remaining strands into haphazard relation, and bonding the fibers together into their rearranged relation.

11. As an article of manufacture, a mat composed of a multiplicity of fine glass fibers, a substantial proportion of said fibers being haphazardly arranged relative to each other in said mat, and a substantial proportion of the fibers being arranged in side-by-side relation in strands having intermingled with the strands to aid in im- the fibers in each of the strands extending in closely spaced relationship along the length of the strand, the haphazardly arranged fibers being intermingled with the strands to aid in imparting integrity of mass structure to the mat.

12. As an article of manfuacture, a mat composed of a multiplicity of fine glass fibers, a substantial proportion of said fibers being arranged in strands with the fibers lying closely together along their length in textile strand form, substantially all of the individual fibers in each strand extending continuously throughout the length of the strand but the strands being discontinuous in the mat, and means holding said strands in the mat.

13. As an article of manufacture, a mat composed of a multiplicity of fine glass fibers, a substantial proportion of said fibers being arranged in strands with the fibers lying closely together along their length in textile strand form, the strands being discontinuous and haphazardly arranged relative to each other in the mat, and means holding said strands together in the mat.

14. As an article of manufacture, a mat composed of a multiplicity of fibers, a substantial proportion of said fibers being haphazardly arranged relative to each other in said mat, and another substantial proportion of the fibers being glass fibers arranged in side-by-side relation in bundles having a compact cross-section and a substantially greater length than transverse dimension with the maporlty of the fibers in each of the bundles extending in closely spaced relationship along the length of the bundle, the haphazardly arranged fibers being intermingled with the bundles in the mat to aid in imparting integrity of mass structure to the mat.

15. As an article of manufacture, a mat composed of a multiplicity of fine glass fibers, a substantial proportion of said fibers being arranged in bundles of compact cross-section and having a substantially greater length than transverse dimension with the fibers lying closely together along their length in each bundle but with the bundles being haphazardly related to each other in the mat, substantially all of the individual fibers in each bundle extending substantially continuously throughout the length of the bundle but the bundles themselves being discontinuous in the mat and of determinate lengths, and means holding said bundles and fibers together in the mat.

RICHARD M. ROBERTS.
THEODORE H. METZLER.

REFERENCES CITED

The following references are of record in the file of this patent:

UNITED STATES PATENTS

| Number | Name | Date |
| --- | --- | --- |
| Re. 22,090 | Powell | May 5, 1942 |
| 1,318,743 | Frederick | Oct. 14, 1919 |
| 1,771,216 | Gossler | July 22, 1930 |
| 1,802,246 | Gams et al. | Apr. 21, 1931 |
| 2,103,769 | Drill | Dec. 28, 1937 |
| 2,130,944 | Bowen | Sept. 20, 1938 |
| 2,202,030 | Siegfried | May 28, 1940 |
| 2,206,059 | Slayter | July 2, 1940 |
| 2,217,538 | Carson | Oct. 8, 1940 |
| 2,252,157 | Bergin et al. | Aug. 12, 1941 |
| 2,288,072 | Collins | June 30, 1942 |
| 2,333,218 | Von Pazsiczky | Nov. 2, 1943 |

Certificate of Correction

Patent No. 2,477,555 July 26, 1949

RICHARD M. ROBERTS ET AL.

It is hereby certified that errors appear in the printed specification of the above numbered patent requiring correction as follows:

Column 9, line 26, strike out "intermingled with the strands to aid in im-" and insert instead *a compact cross-section with the majority of*;

and that the said Letters Patent should be read with these corrections therein that the same may conform to the record of the case in the Patent Office.

Signed and sealed this 10th day of January, A. D. 1950.

[SEAL]

THOMAS F. MURPHY,
*Assistant Commissioner of Patents.*